United States Patent Office 3,027,275
Patented Mar. 27, 1962

3,027,275
METHOD FOR APPLYING A MATTE FINISH TO SHAPED ALKENYL AROMATIC RESIN SURFACE AND ARTICLE OBTAINED THEREFROM
William R. R. Park, Midland, Mich., assignor to The Dow Chemical Company, Midland, Mich., a corporation of Delaware
No Drawing. Filed Apr. 4, 1960, Ser. No. 19,492
10 Claims. (Cl. 117—138.8)

This invention relates to a method of treating the surfaces of shaped articles such as films, sheets, panels, and the like fabricated from alkenyl aromatic resins to simultaneously destaticize and give a water-based, ink-receptive, matte finish and the product obtained thereby.

The invention is particularly adapted to be practiced with swellable, integral, solid styrene polymer film or sheets. Such a polymer, which may have an essentially linear molecular configuration or be in a cross-linked form, is employed herein as being generally representative of alkenyl aromatic compounds of the type that contain at least about 50 weight percent of at least one polymerized alkenyl aromatic compound or monomer having the general formula: $Ar-CR=CH_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of alpha-methyl styrene, ar-methyl styrene (or vinyl toluene), the several mono- and di-chlorostyrenes and ar-dimethyl styrenes, including copolymers thereof with such materials as vinylidene chloride and acrylonitrile; cross-linked, polyfunctional substances as divinyl benzene; and graft copolymers with other polymeric substances (such as other elastomeric polymers) may frequently be utilized with benefits commensurate with or in excess of those which are derivable from employment of polystyrene alone.

In the past, matte surfaces were prepared by the treatment of a shaped article with a solvent such as acetone for a short period of time or by roughening the surface by sand blasting or other abrasive meaans. Such procedures are described in British patent specification No. 440,926. Shaped articles treated in this manner have a high static surface charge, and, when thin sheets or films having a matte finish are prepared, they tend to adhere to each other strongly and are not readily separated. When separated and released, they are quickly drawn together into their original close contact. Sheets, films, and other shaped articles fabricated from polymeric materials having a high surface resistivity, i.e., surface resistivity above about $10^{12}$ ohms per centimeter, are conventionally destaticized by the addition of various wetting agents or other materials containing highly polarized or ionizable groups.

When sheets or other articles having a matte finish treated with conventional destaticizing agents are employed as writing surfaces and particularly with water-based inks such as are conventionally used for fountain pens and similar writing instruments, the water-based ink tends to spread on the sheet due to the wetting action of the destaticizing agent. Uncontrolled spreading of the ink results in unsatisfactory and unsightly markings and frequently illegibility of the characters.

It is an object of this invention to provide a destaticized sheet that is prepared from alkenyl aromatic resins having a matte finish and surface characteristics suitable for marking with water-based inks.

It is another object of this inveintion to provide a simple two-step process for the preparation of water-based ink-writable matte surface alkenyl aromatic shaped articles.

It is a further object of this invention to provide a simple two-step process for the preparation of water-based ink-writable matte surfaced alkenyl aromatic film.

These benefits and other advantages may be obtained by treating the surface of a shaped article prepared from an alkenyl aromatic polymer resin to a mixture comprising an organic liquid medium which is a swelling agent for said alkenyl aromatic resin, having dispersed therein an alkali metal salt of a sulfonated alkenyl aromatic resin until the surface of said article has been swollen by said swelling agent and subsequently removing the volatile components of said mixture from said article.

A wide variety of organic swelling agents may be employed in the practice of the invention. Acetone is particularly suitable for the practice of this invention. Ketonic compounds such as methyl isobutyl ketone, methyl ethyl ketone, and the like may also be used with good results. Various solvent mixtures are successfully employed which comprise a swelling agent in admixture with other swelling agents or substantially inert diluents such as water, alcohols and the like. A mixture of swelling agents and nonsolvents which is eminently successful in the practice of the invention comprises 2 parts of ethanol, 1 part butanol, 1 part methyl isobutyl ketone, 1 part ethyl acetate, and 2 parts toluene. A choice of the particular swelling agent or mixtures thereof with or without diluents used will depend on the particular alkenyl aromatic resin employed, the time of exposure desired, and the temperature of the bath. Usually, it is most advantageous to employ, for dispersion of the alkali metal salt of an alkenyl aromatic resin and subsequent treatment of an alkenyl aromatic resin article, swelling agents or swelling agent containing mixtures that boil below about 135° C. and above about 40° C. Swelling agents or swelling agent containing mixtures boiling above 120° C. are frequently difficult to remove from the surface of the shaped article, and agents boiling below 40° C. frequently are too volatile to permit convenient handling without special precautions.

The alkali metal salts of sulfonated alkenyl aromatic resins which may be employed in the practice of the invention are usually prepared by the sulfonation and subsequent neutralization of swellable polymers such as polystyrene which may have an essentially linear molecular configuration or be in a cross-linked form. Such polymers are employed herein as being generally representative of alkenyl aromatic compounds of the type that contain at least about 50 weight percent of at least one polymerized alkenyl aromatic compound of monomer having the general formula: $Ar-CR=CH_2$, wherein R is hydrogen or methyl and Ar is an aromatic radical, advantageously of the benzene series, of from 6 to 10 carbon atoms (including the carbon atoms in any ring substituents on the aromatic nucleus). Thermoplastic polymers and copolymers of styrene and polymers and copolymers of alpha-methyl styrene, ar-methyl styrene (or vinyl toluene), the several mono- and di-chlorostyrenes and ar-dimethyl styrenes, including copolymers thereof with such materials as vinylidene chloride and acrylonitrile; cross-linked, poly-functional substances as divinyl benzene; and graft copolymers with other polymeric substances (such as other elastomeric polymers) may frequently be utilized with benefits commensurate with or in excess of those which are derivable from employment of polystyrene alone. Such polymers on sulfonation usually contain between about 0.1 and 1.5 sulfonate groups per alkenyl aromatic monomer units, having a molecular weight between about 50,000 and 750,000 molecular weight units.

A surface-treating solution or dispersion is readily prepared by first dispersing an aqueous solution of the alkali metal salt of a sulfonated alkenyl aromatic resin in a minor portion of the organic liquid medium of the treating composition and subsequently diluting to the desired concentration, usually between from about 0.1 percent to about 1 percent based on the total weight of the treating medium and advantageously between about 0.15 percent and about 0.35 percent based on the total weight of the treating medium. An aqueous solution of the alkali metal salts of the sulfonated alkenyl aromatic resins advantageously may be dissolved or dispersed in a portion of the treating liquid or if a multicomponent mixture is employed in a portion of any one or all of the liquid components by employing high-speed agitation for a period of time which is dependent on the particular liquid system or dispersing medium employed and the molecular weight of the alkali metal salt of the sulfonated alkenyl aromatic resin.

Generally, it is advantageous to treat the surface at a temperature with the destaticizing composition within a temperature range of from about 0° C. to about 60° C. It is frequently desirable to employ a temperature range from about 5° C. to about 30° C. and oftentimes beneficial to employ a range of from about 5° C. to 15° C. A particular temperature which is most beneficial for any specific treating solution or dispersion and any specific alkenyl aromatic resin will depend in part upon the specific characteristics of the swelling agents employed in the treating composition and partly on the swelling characteristics of the alkenyl aromatic resin. Shaped articles prepared from higher molecular weight alkenyl aromatic resins generally require a longer time and a higher temperature in contact with the treating composition than lower molecular weight resins. Similarly, a highly active swelling agent will require a relatively shorter contact than would a less active swelling agent.

In the practice of the invention, various methods may be employed in applying the treating composition to the surface of shaped alkenyl aromatic resins. In the case of solid, relatively large, block-like articles, it is frequently advantageous to dip the article in a bath of a suitable treating composition whereas filaments, thin films, and sheets may be treated by dipping, rolling spraying, or brushing the treating medium or composition onto the surface of the polymer.

The volatile components of the treating composition are readily removed from the treated surface by evaporation. Frequently, exposure of the treated surface to air is sufficient, but, often, particularly when continuous operation is contemplated, an air blast directed toward the surface being treated is particularly advantageous.

By way of further illustration, 150 grams of a 10 percent aqueous solution of sodium polystyrene sulfonate (molecular weight about 500,000) and containing about 1 sulfonate group per monomer unit was diluted with 300 milliliters of methanol. Five hundred milliliters of acetone were added slowly with vigorous agitation. By the foregoing procedure, a stable, small particle size dispersion of sodium polystyrene sulfonate in a methanol-acetone mixture was obtained. The sodium polystyrene sulfonate dispersion in turn is added to 10 liters of acetone resulting in a stable dispersion of sodium polystyrene sulfonate in acetone containing a small amount of methanol and water. Polystyrene film, approximately 1 mil thick, was continually passed through a bath at a temperature of 25° C. and with a residence time of approximately 0.3 second. On emerging from the bath, excess liquid was removed by a pair of rotating wire-wound metering rods, and the film dried by applying a stream of 16° C. air to each side of the film. The resulting product was a nonstatic film which exhibited no tendency to adhere to itself or other nonconductive charged surface.

Application of the water-based ink to the treated film by means of a fountain pen showed the film to have writing characteristics very similar to conventional bond paper. No tendency was observed for the ink to spread beyond the normal width of the line determined by the trace of the pen point on the surface of the film.

In contrast, a similar film was treated with a .1 percent acetone solution of sodium dodecyl benzene sulfonate in a manner similar to the above illustration. Film treated with dodecyl benzene sulfonate-acetone mixture did not accept ink in the manner of the film prepared according to the invention. The application of dodecyl benzene sulfonate caused the ink to spread and run in the areas adjacent to the direct application of ink and caused blurred and distorted lines.

In a similar manner other shaped articles prepared from alkenyl aromatic resins may be treated to give an ink receptive matte surface.

As is apparent, the method is susceptible of being embodied with various alterations and modifications from that which is being described in the preceding description and specification. For this reason, it is to be understood that all of the foregoing is merely intended to be illustrative and is not to be construed as interpreted as being restrictive or otherwise limitative of the present invention except as set forth in the appended claims.

What is claimed is:

1. A method of preparing a writable matte surface on a shaped article fabricated from a swellable alkenyl aromatic resin comprising exposing the surface of said shaped article to a dispersion of an alkali metal salt of a sulfonated alkenyl aromatic resin in an organic liquid medium boiling below 135° C. which is a swelling agent for said alkenyl aromatic resin and subsequently removing the volatile components of said organic liquid medium from said article.

2. A method of preparing a water-based, ink-receptive, matte finish surface on a shaped article fabricated from a swellable alkenyl aromatic resin comprising treating the surface of said shaped article with a dispersion of from about 0.1 percent to about 1 percent of a sulfonated alkenyl aromatic resin in a medium boiling below 135° C. which is a swelling agent for said alkenyl aromatic resin while maintaining a temperature within the range of from about 10° C. to about 60° C. at the surface of said article and subsequently removing the volatile components of said organic liquid medium from said article.

3. The method of claim 2, wherein said alkenyl aromatic resin is polystyrene.

4. The method of claim 2, wherein said alkali metal salt of a sulfonated alkenyl aromatic resin is sodium polystyrene sulfonate having molecular weight of from about 50,000 to about 750,000 and containing between about 0.1 and 1.5 sulfonate groups per molecule.

5. The method of claim 2, wherein said shaped article is a polystyrene film.

6. The method of claim 2, wherein said organic liquid medium contains a major proportion of acetone.

7. A water-based, ink-receptive shaped article fabricated from an alkenyl aromatic resin having a matte surface and in intimate association with said matte surface an alkali metal salt of an alkenyl aromatic resin.

8. A shaped article in accordance with claim 7, wherein said alkenyl aromatic resin is polystyrene.

9. A shaped article in accordance with claim 7, wherein said alkali metal salt of a sulfonated alkenyl aromatic resin is sodium polystyrene sulfonate.

10. A shaped article in accordance with claim 9, wherein said shaped article is a polystyrene film.

References Cited in the file of this patent

UNITED STATES PATENTS

| | | |
|---|---|---|
| 2,533,210 | Baer | Dec. 12, 1950 |
| 2,680,080 | Eisen | June 1, 1954 |
| 2,700,001 | Cohen et al. | Jan. 18, 1955 |